US012326682B2

(12) United States Patent
Nakae

(10) Patent No.: US 12,326,682 B2
(45) Date of Patent: Jun. 10, 2025

(54) IMAGE FORMING APPARATUS

(71) Applicant: KYOCERA Document Solutions Inc., Osaka (JP)

(72) Inventor: Sadanori Nakae, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/626,780

(22) Filed: Apr. 4, 2024

(65) Prior Publication Data

US 2024/0345520 A1 Oct. 17, 2024

(30) Foreign Application Priority Data

Apr. 12, 2023 (JP) ................................ 2023-064759

(51) Int. Cl.

*G03G 15/00* (2006.01)
*G03G 15/01* (2006.01)
*G03G 15/16* (2006.01)
*G03G 21/00* (2006.01)

(52) U.S. Cl.

CPC ..... *G03G 15/5004* (2013.01); *G03G 15/0126* (2013.01); *G03G 15/0131* (2013.01); *G03G 15/0189* (2013.01); *G03G 15/161* (2013.01); *G03G 15/5008* (2013.01); *G03G 15/5054* (2013.01); *G03G 15/80* (2013.01); *G03G 21/0058* (2013.01); *G03G 21/007* (2013.01)

(58) Field of Classification Search

CPC ........... G03G 15/5004; G03G 15/0126; G03G 15/0131; G03G 15/0189; G03G 15/161; G03G 15/5008; G03G 15/5054; G03G 15/80; G03G 21/0058

See application file for complete search history.

(56) References Cited

U.S. PATENT DOCUMENTS

2008/0317506 A1 12/2008 Furukawa ..................... 399/223
2014/0348530 A1* 11/2014 Murayama ......... G03G 15/5054 399/49
2017/0285508 A1* 10/2017 Hirado ................. G03G 15/161

FOREIGN PATENT DOCUMENTS

JP 2001-005360 A 1/2001
JP 2009-003377 A 1/2009

* cited by examiner

*Primary Examiner* — Sandra Brase
(74) *Attorney, Agent, or Firm* — Stein IP, LLC

(57) ABSTRACT

An image forming apparatus performs a transfer residual toner collection operation including a toner adhesion step of allowing transfer residual toner to temporarily adhere to the collecting roller during execution of image forming operation, a toner moving step of moving the transfer residual toner adhered on the collecting roller to an image carrier after the image forming operation is finished, and a toner collecting step of moving the transfer residual toner from the image carrier to an intermediate transfer body and collecting the transfer residual toner. The control unit controls an image forming unit having white background toner amount that is a threshold value or more, to apply the collecting roller with a voltage having the same polarity as toner charge polarity in the toner adhesion step, and to apply the collecting roller with a voltage having opposite polarity to the toner charge polarity in the toner moving step.

7 Claims, 4 Drawing Sheets

IMAGE FORMING APPARATUS

INCORPORATION BY REFERENCE

This application is based upon and claims the benefit of priority from the corresponding Japanese Patent Application No. 2023-064759 filed Apr. 12, 2023, the entire contents of which are hereby incorporated by reference.

BACKGROUND

The present disclosure relates to an electrophotographic image forming apparatus, and particularly to an intermediate transfer type image forming apparatus, in which individual color toner images formed on image carriers are primarily transferred onto an intermediate transfer body, and then are secondarily transferred onto a recording medium.

Conventionally, there is known an intermediate transfer type image forming apparatus including an endless intermediate transfer belt that is rotated in a predetermined direction, and a plurality of image forming units disposed along the intermediate transfer belt, in which the image forming units sequentially overlay individual color toner images onto the intermediate transfer belt in primary transfer, and then a secondary transfer roller (transfer member) transfers the toner images onto a recording medium such as a paper sheet in secondary transfer.

In this image forming apparatus, after the primary transfer, a part of the toner image (transfer residual toner) remains on a photosensitive drum (image carrier) disposed in each of the image forming units. Therefore, it is necessary to remove the transfer residual toner on the photosensitive drum in preparation for next image forming operation.

SUMMARY

An image forming apparatus according to one aspect of the present disclosure includes a plurality of image forming units, an intermediate transfer body, a primary transfer member, a secondary transfer member, a collecting roller, a cleaning mechanism, a developing voltage power supply, a charging voltage power supply, a transfer voltage power supply, a cleaning voltage power supply, and a control unit. The plurality of image forming units each include an image carrier having a photosensitive layer on a surface thereof, a charging device that charges the image carrier, an exposing device that exposes the image carrier charged by the charging device so as to form an electrostatic latent image, and a developing device having a developer carrier that carries developer containing toner, the developing device allowing the toner to adhere to the electrostatic latent image formed on the image carrier, so as to form a toner image. The intermediate transfer body is capable of moving along the plurality of image forming units, so that the toner image formed by the image forming unit is primarily transferred onto the intermediate transfer body. The primary transfer member primarily transfers the toner image formed on the image carrier onto the intermediate transfer body. The secondary transfer member secondarily transfers onto a recording medium the toner image transferred onto the intermediate transfer body. The collecting roller is disposed in each of the plurality of image forming units, so as to collect transfer residual toner remaining on the image carrier after the primary transfer. The cleaning mechanism removes the toner adhered to the intermediate transfer body. The developing voltage power supply applies a developing voltage to the developer carrier. The charging voltage power supply applies a charging voltage to the charging device. The transfer voltage power supply applies transfer voltages to the primary transfer member and the secondary transfer member. The cleaning voltage power supply applies a voltage to the collecting roller. The control unit controls the image forming unit, the developing voltage power supply, the transfer voltage power supply, the charging voltage power supply, and the cleaning voltage power supply. The image forming apparatus performs a transfer residual toner collection operation including a toner adhesion step of applying a voltage having opposite polarity to charge polarity of the toner to the collecting roller during execution of an image forming operation, so as to allow the transfer residual toner to temporarily adhere to the collecting roller, a toner moving step of separating the developer carrier and the image carrier from each other after finishing the image forming operation, and then applying a voltage having the same polarity as the charge polarity of the toner to the collecting roller, so as to move the transfer residual toner adhered on the collecting roller to the image carrier, and a toner collecting step of moving the transfer residual toner from the image carrier to the intermediate transfer body, so that the cleaning mechanism collects the transfer residual toner. The image forming apparatus further includes a toner amount detection unit that detects white background toner amount on the intermediate transfer body. The control unit controls the image forming unit having the white background toner amount that is a threshold value or more, to apply the voltage having the same polarity as the charge polarity of the toner to the collecting roller in the toner adhesion step, and to apply the voltage having opposite polarity to the charge polarity of the toner to the collecting roller in the toner moving step, so as to perform the transfer residual toner collection operation.

DETAILED DESCRIPTION

Figure 1:
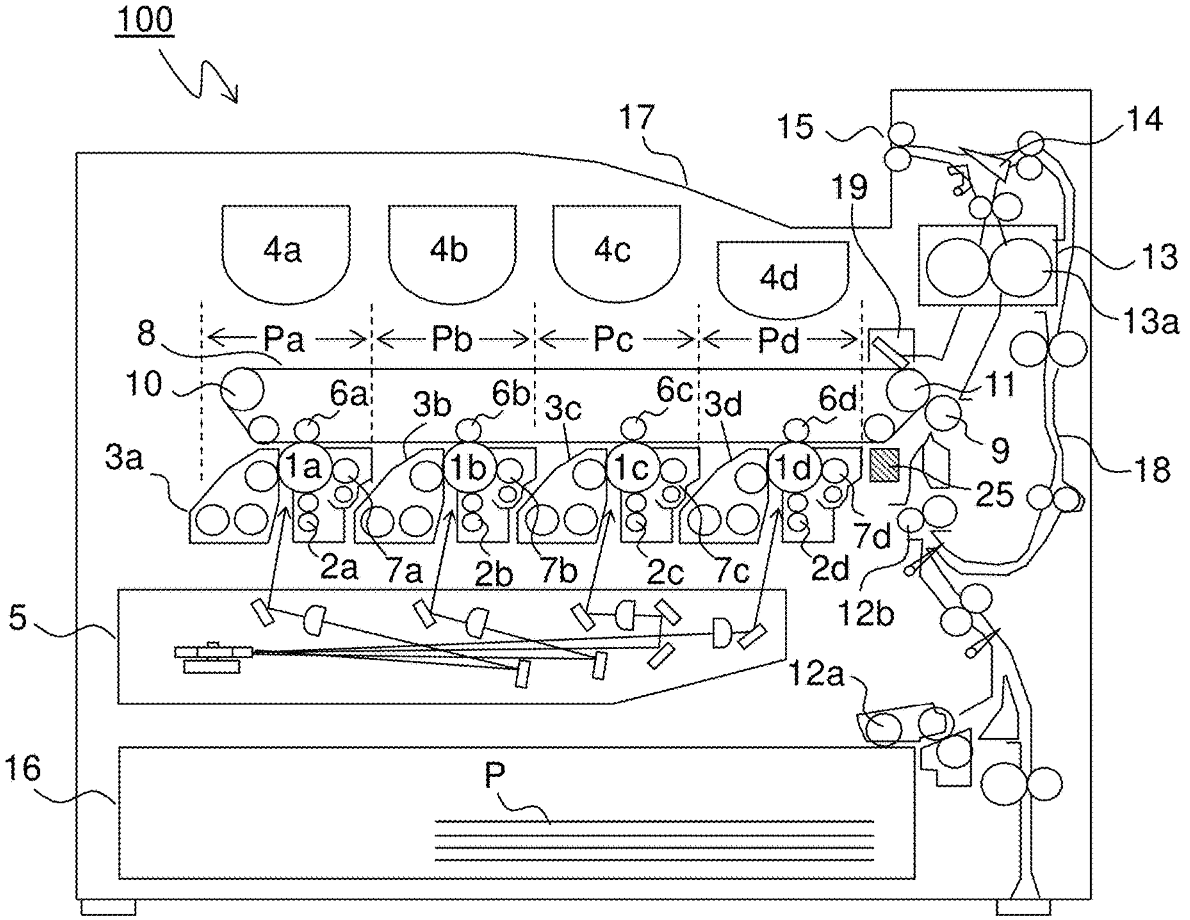
FIG. 1 is a cross-sectional side view illustrating an internal structure of an image forming apparatus according to an embodiment of the present disclosure.

Hereinafter, an embodiment of the present disclosure is described with reference to the drawings. FIG. 1 is a cross-sectional side view illustrating an internal structure of an image forming apparatus 100 according to an embodiment of the present disclosure. In a main body of the image forming apparatus 100 (e.g. a color printer), there are four image forming units Pa, Pb, Pc, and Pd disposed in order from an upstream side in a conveying direction (from the left side in FIG. 1). These image forming units Pa to Pd are disposed corresponding to four images of different colors (yellow, magenta, cyan, and black colors), and the yellow, cyan, magenta, and black images are sequentially formed each by charging, exposing, developing, and transferring steps.

These image forming units Pa to Pd are provided with photosensitive drums (image carriers) 1a, 1b, 1c, and 1d, respectively, each of which carries a visual image (toner image) of each color. Further, an intermediate transfer belt 8, which is rotated in a counter-clockwise direction in FIG. 1 by a belt drive motor (not shown), is disposed adjacent to the image forming units Pa to Pd. The toner images formed on the photosensitive drums 1a to 1d are sequentially and primarily transferred and overlaid onto the intermediate transfer belt 8, which moves while contacting with the photosensitive drums 1a to 1d. After that, the toner images primarily transferred onto the intermediate transfer belt 8 are secondarily transferred by a secondary transfer roller 9 onto a paper sheet P as an example of a recording medium. Further, the paper sheet P with the toner images secondarily transferred passes a fixing unit 13 in which the toner images are fixed, and then is discharged from the main body of the image forming apparatus 100. The photosensitive drums 1a to 1d are rotated in a clockwise direction in FIG. 1, while an image forming process is performed in each of the photosensitive drums 1a to 1d.

The paper sheet P onto which the toner image is secondarily transferred is stored in a paper sheet cassette 16 disposed in a lower part of the main body of the image forming apparatus 100, and is conveyed by a sheet feed roller 12a and a registration roller pair 12b to a nip part between the secondary transfer roller 9 and a drive roller 11 of the intermediate transfer belt 8. A dielectric resin sheet is used for the intermediate transfer belt 8, and a seamless belt is mainly used for it. In addition, on a downstream side of the secondary transfer roller 9, there is disposed a belt cleaning device 19 for removing toner and the like remaining on a surface of the intermediate transfer belt 8.

Next, the image forming units Pa to Pd are described. Around and below the photosensitive drums 1a to 1d disposed in a rotatable manner, there are disposed charging devices 2a, 2b, 2c, and 2d that charge the photosensitive drums 1a to 1d, respectively, an exposing device 5 that exposes the photosensitive drums 1a to 1d corresponding to image information, developing devices 3a, 3b, 3c, and 3d that form toner images on the photosensitive drums 1a to 1d, respectively, and cleaning devices 7a, 7b, 7c, and 7d that remove toner (transfer residual toner) and the like remaining on the photosensitive drums 1a to 1d, respectively.

When image data is input from a host device such as a personal computer, the charging devices 2a to 2d first uniformly charge the surfaces of the photosensitive drums 1a to 1d, respectively. Next, the exposing device 5 emits light corresponding to the image data so as to form electrostatic latent images corresponding to the image data on the photosensitive drums 1a to 1d, respectively. The developing devices 3a to 3d are filled with predetermined amounts of two-component developer containing toner of yellow, magenta, cyan, and black colors, respectively. Note that when a ratio of the toner in the two-component developer filled in the developing device 3a to 3d is decreased below a specified value due to toner image formation described later, the toner is replenished to the developing device 3a to 3d from a toner container 4a to 4d. The toner in the developer is supplied to the photosensitive drum 1a to 1d from the developing device 3a to 3d and electrostatically adheres to the same, so as to form the toner image corresponding to the electrostatic latent image formed by exposure from the exposing device 5.

Further, a primary transfer roller 6a to 6d applies an electric field of a predetermined transfer voltage between the primary transfer roller 6a to 6d and the photosensitive drum 1a to 1d, and hence the toner images of yellow, magenta, cyan, and black colors on the photosensitive drums 1a to 1d are primarily transferred onto the intermediate transfer belt 8. These four color images are formed with a predetermined positional relationship for forming a predetermined full color image. After that, in preparation for following formation of a new electrostatic latent image, the cleaning devices 7a to 7d remove the toner and the like remaining on the surfaces of the photosensitive drums 1a to 1d after the primary transfer.

The intermediate transfer belt 8 is wrapped around a driven roller 10 on the upstream side and the drive roller 11 on the downstream side. When the drive roller 11 is rotated by the belt drive motor (not shown), the intermediate transfer belt 8 starts to rotate in the counter-clockwise direction, and the paper sheet P is conveyed from the registration roller pair 12b at a predetermined timing, to the nip part (secondary transfer nip part) between the drive roller 11 and the secondary transfer roller 9 disposed adjacent thereto, so that the toner images on the intermediate transfer belt 8 are secondarily transferred onto the paper sheet P. The toner and the like remaining on the surface of the intermediate transfer belt 8 after the secondary transfer are removed by the belt cleaner 19. The paper sheet P with the toner images secondarily transferred is conveyed to the fixing unit 13.

The paper sheet P conveyed to the fixing unit 13 is heated and pressed by a fixing roller pair 13a, and the toner images are fixed to the surface of the paper sheet P, so that a predetermined full color image is formed. A conveying direction of the paper sheet P with the full color image formed is selected by a branch part 14 that branches in a plurality of directions, and the paper sheet P is discharged by a discharge roller pair 15 onto a discharge tray 17 as it is (or after being sent to a double-side conveying path 18 and after image formation on both sides).

An image density sensor 25 is disposed at a position facing the drive roller 10 with the intermediate transfer belt 8 therebetween. As the image density sensor 25, in general, an optical sensor is used, which includes a light emitting element such as an LED and a light receiving element such as a photodiode. When measuring toner adhesion amount on the intermediate transfer belt 8, the light emitting element emits measuring light to each patch image (reference image) formed on the intermediate transfer belt 8, and the measuring light enters the light receiving element as light after reflected by the toner and light after reflected by a belt surface.

The reflected light from the toner and the reflected light from the belt surface each include specular reflection light and diffused reflection light. The specular reflection light and the diffused reflection light are separated by a polarization light separation prism, and then enter separate light receiving elements, respectively. Each light receiving element performs photoelectric conversion of the received specular reflection light or the diffused reflection light, so as to output an output signal to the main control unit 80 (see FIG. 2).

Further, on the basis of characteristic changes of the output signals of the specular reflection light and the diffused reflection light, image density (toner amount) and image position of the patch image are detected, and they are compared with predetermined reference density and reference position, respectively, and a characteristic value of a developing voltage, exposure start position and timing of the exposing device 5, and the like are adjusted. Thus, image density correction and color shift correction (calibration) are performed for each color.

Figure 2:
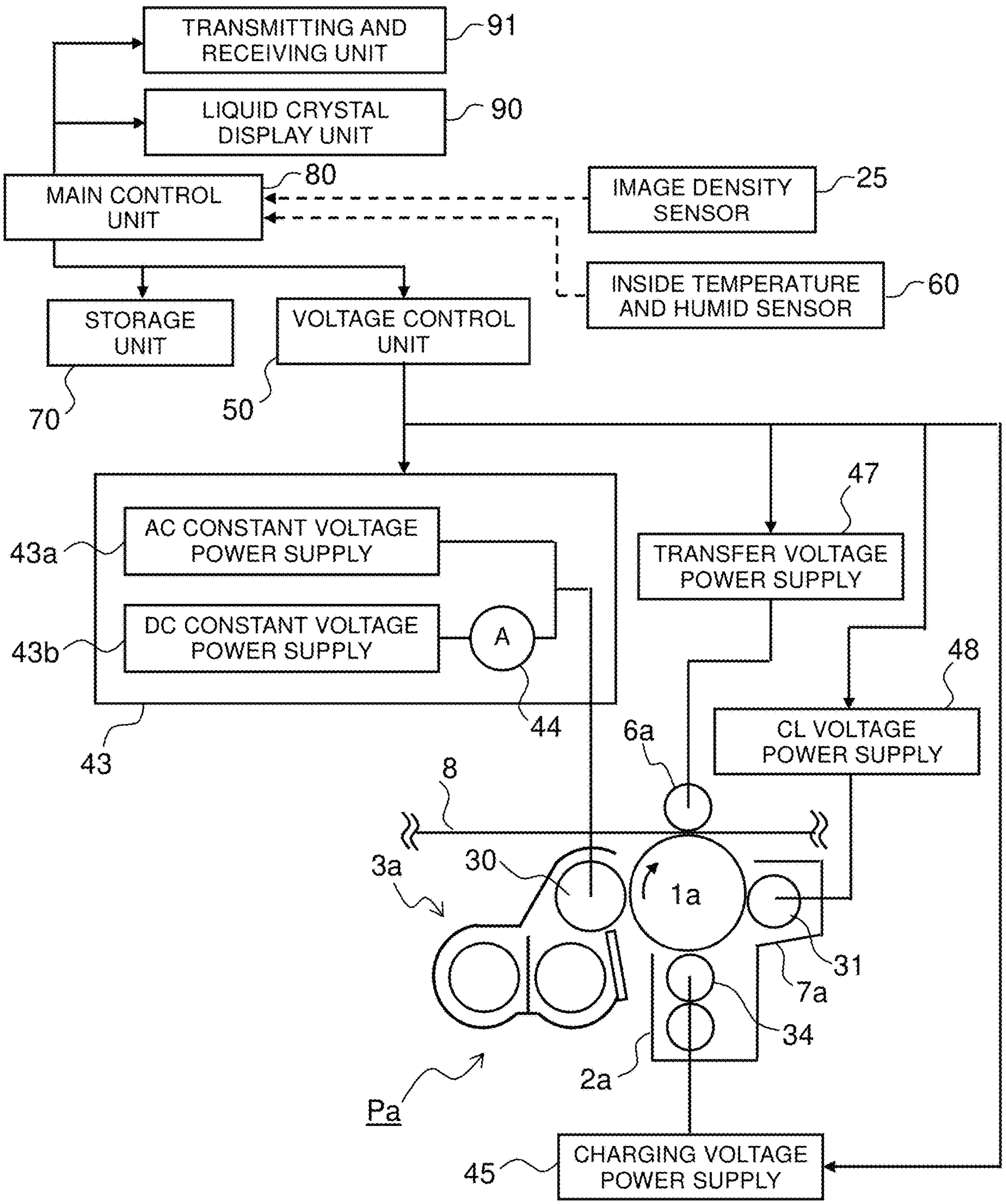
FIG. 2 is a partial enlarged view of an image forming unit and its vicinity, including control paths of the image forming apparatus.

FIG. 2 is a partial enlarged view of the image forming unit Pa and its vicinity, including control paths of the image forming apparatus 100. In the following description, a structure and control paths of the image forming unit Pa are described. The image forming units Pb to Pd have the same structure and control paths as those of the image forming unit Pa, and hence descriptions thereof are omitted.

The developing device 3*a* includes a developing roller 30 that carries the two-component developer in the developing device 3*a*. The developing roller 30 is connected to a developing voltage power supply 43 that produces an oscillating voltage in which a DC voltage and an AC voltage are superimposed. The developing voltage power supply 43 includes an AC constant voltage power supply 43*a* and a DC constant voltage power supply 43*b*. The AC constant voltage power supply 43*a* outputs a sine wave AC voltage generated from a pulse-modulated low DC voltage using a step up transformer (not shown). The DC constant voltage power supply 43*b* outputs a DC voltage obtained by rectifying the sine wave AC voltage generated from a pulse-modulated low DC voltage using the step up transformer.

In image formation, the developing voltage power supply 43 outputs the developing voltage, in which the AC voltage from the AC constant voltage power supply 43*a* is superimposed on the DC voltage from the DC constant voltage power supply 43*b*. A current detection unit 44 detects developing current flowing between the photosensitive drum 1*a* and the developing roller 30.

A charging voltage power supply 45 applies a charging roller 34 of the charging device 2*a* with a charging voltage in which an AC voltage is superimposed on a DC voltage. The charging voltage power supply 45 has the same structure as that of the developing voltage power supply 43.

A transfer voltage power supply 47 applies the primary transfer rollers 6*a* to 6*d* and the secondary transfer roller 9 (see FIG. 1) with a primary transfer voltage and a secondary transfer voltage, respectively, which have the opposite polarity to the toner (a negative polarity). In this embodiment, a constant current control is performed, in which the primary transfer rollers 6*a* to 6*d* and the secondary transfer roller 9 are applied with the transfer voltages, which supply the primary transfer rollers 6*a* to 6*d* and the secondary transfer roller 9 with constant current (transfer current) having the opposite polarity to the toner (a negative polarity).

The cleaning device 7*a* includes a collecting roller 31 that temporarily holds the transfer residual toner on the surface of the photosensitive drum 1*a*. The collecting roller 31 is connected to a cleaning voltage power supply 48 that produces a DC voltage. The cleaning voltage power supply 48 applies the collecting roller 31 with a voltage having the same polarity as the toner (a positive polarity) and a voltage having the opposite polarity to the same (negative polarity). The cleaning voltage power supply 48 has the same structure as the DC constant voltage power supply 43*b*.

Next, a control system of the image forming apparatus 100 is described with reference to FIG. 2. The image forming apparatus 100 is provided with a main control unit 80 constituted of a CPU and the like. The main control unit 80 is connected to a storage unit 70 constituted of a ROM, a RAM, and the like. On the basis of a control program and data for control stored in the storage unit 70, the main control unit 80 controls individual units of the image forming apparatus 100 (the charging devices 2*a* to 2*d*, the developing devices 3*a* to 3*d*, the exposing device 5, the primary transfer rollers 6*a* to 6*d*, the cleaning devices 7*a* to 7*d*, the secondary transfer roller 9, the fixing unit 13, the developing voltage power supply 43, the charging voltage power supply 45, the transfer voltage power supply 47, the cleaning voltage power supply 48, a voltage control unit 50, and the like).

On the basis of control signals sent from the main control unit 80, the voltage control unit 50 controls the developing voltage power supply 43 that applies the developing voltage to the developing roller 30, the charging voltage power supply 45 that applies the charging voltage to the charging roller 34, the transfer voltage power supply 47 that applies the transfer voltages to the primary transfer rollers 6*a* to 6*d* and the secondary transfer roller 9, and the cleaning voltage power supply 48 that applies the voltage to the collecting roller 31. Note that the voltage control unit 50 may be constituted of the control program stored in the storage unit 70.

An inside temperature and humid sensor 60 always detects temperature and relative humid inside the image forming apparatus 100, specifically near the image forming units Pa to Pd. Detected temperature and humid are sent to the main control unit 80.

The main control unit 80 is connected to a liquid crystal display unit 90 and a transmitting and receiving unit 91. The liquid crystal display unit 90 functions as a touch panel for a user to make various settings of the image forming apparatus 100, and displays states of the image forming apparatus 100, an image forming status, the number of printed sheets, and the like. The transmitting and receiving unit 91 performs external communication using a telephone line or the Internet line. The transmitting and receiving unit 91 functions as an input unit that receives a print command and image data from a host device such as a personal computer.

Next described is a collection operation of the transfer residual toner in the image forming apparatus 100 of this embodiment. When printing operation is started, the toner image formed on the photosensitive drum 1*a* to 1*d* is primarily transferred onto the intermediate transfer belt 8 by the primary transfer roller 6*a* to 6*d*. Then, the collecting roller 31 of the cleaning device 7*a* to 7*d*, which is disposed on the downstream side of the primary transfer roller 6*a* to 6*d* in the rotation direction of the photosensitive drum 1*a* to 1*d*, is applied with a voltage having the opposite polarity (negative polarity) to a positive polarity that is a normal charge polarity of the toner (hereinafter simply referred to as a toner charge polarity). In this way, the transfer residual toner on the photosensitive drum 1*a* to 1*d* is allowed to temporarily adhere to the collecting roller 31 (a toner adhesion step).

After that, at timing such as between paper sheets in continuous printing or after printing operation, the developing roller 30 is separated from the photosensitive drum 1*a* to 1*d*. In this state, the collecting roller 31 is applied with a voltage having the same polarity (positive polarity) as the toner charge polarity (positive polarity). In this way, the transfer residual toner held by the collecting roller 31 is moved to the photosensitive drum 1*a* to 1*d* (a toner moving step). The transfer residual toner after moving to the photosensitive drum 1*a* to 1*d* is transferred onto the intermediate transfer belt 8 by the primary transfer roller 6*a* to 6*d*, and is removed and collected by the belt cleaning device 19 (a toner collecting step).

In the intermediate transfer type image forming apparatus 100, when a toner charge amount is decreased, a ratio of reversely charged toner is increased, which is charged to the opposite polarity (negative polarity) to the toner charge polarity (positive polarity) after the primary transfer. If the ratio of the reversely charged toner on the intermediate transfer belt 8 is increased, reverse transfer may occur as follows. For instance, when the toner image primarily transferred by the image forming unit Pa passes the image forming unit Pb to Pd on the downstream side, the toner adheres to the photosensitive drum 1*b* to 1*d* of the image forming unit Pb to Pd.

Figure 3:
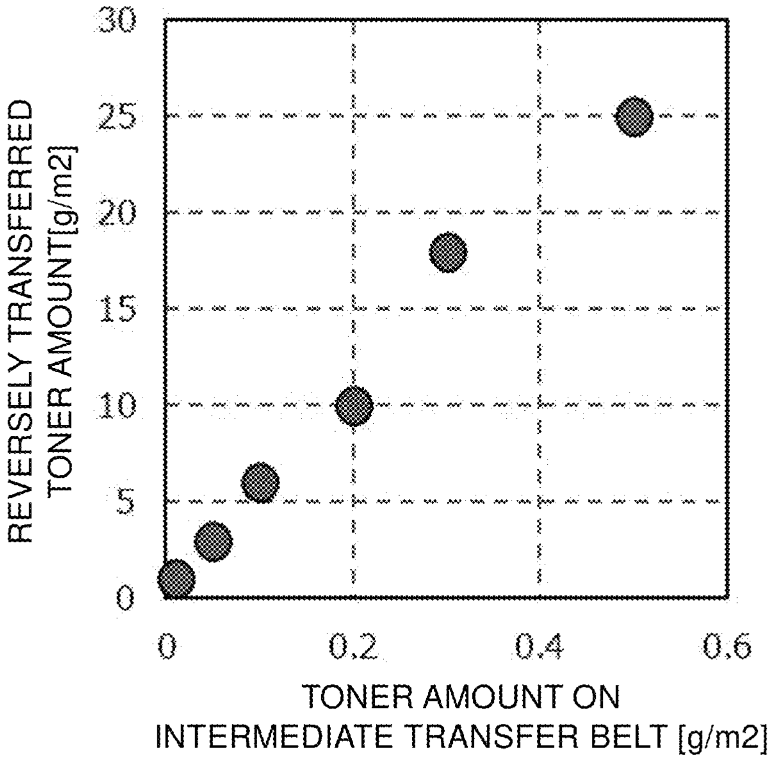
FIG. 3 is a graph indicating a relationship between toner amount on an intermediate transfer belt and reversely transferred toner amount in the image forming unit on the downstream side.

FIG. 3 is a graph indicating a relationship between toner amount on the intermediate transfer belt 8 and reversely transferred toner amount in the image forming unit Pb to Pd on the downstream side. As illustrated in FIG. 3, when the toner amount on the intermediate transfer belt 8 (fog toner amount) increases, reversely transferred toner amount to the photosensitive drum 1*b* to 1*d* of the image forming unit Pb to Pd on the downstream side also increases.

At this time, if the toner adheres to a white background (non-image part) of the photosensitive drum 1*b* to 1*d*, background fogging may occur. In addition, the reversely transferred toner has the same polarity (negative polarity) as the cleaning voltage applied to the collecting roller 31, and hence it is not collected by the collecting roller 31, but after passing the charging devices 2*a* to 2*d*, it has the normal polarity (positive polarity) again and is collected by the developing roller 30. Thus, mixture of colors may occur.

Therefore, in the image forming apparatus 100 of this embodiment, toner amount in a white background on the intermediate transfer belt 8 (hereinafter referred to as white background toner amount) is measured, and a transfer residual toner collection operation is performed, in which if the white background toner amount is a preset threshold value or more, when toner is temporarily adhered to the collecting roller 31, a voltage having the same polarity as a toner charge polarity is applied, and when the transfer residual toner is moved to the photosensitive drum 1*a* to 1*d* again, a voltage having opposite polarity to the toner charge polarity is applied. Hereinafter, there are described a method of measuring the white background toner amount on the intermediate transfer belt 8, and an execution procedure of the transfer residual toner collection operation based on the method, as a characterized part of the present disclosure.

(Method of Measuring White Background Toner Amount)

The white background toner amount on the intermediate transfer belt 8 is measured as follows. A reference image (patch image) is formed under preset image forming conditions, and is primarily transferred onto the intermediate transfer belt 8. At this time, the white background toner amount is detected by the image density sensor 25. If the detected white background toner amount is the threshold value or more, it can be estimated that toner charge amount is decreased.

Examples of timing for measuring the white background toner amount include before starting a print job, such as when the image forming apparatus 100 is powered on (when the power thereof is turned on) or when returning from a sleep mode (power saving mode).

(Transfer Residual Toner Collection Operation)

In the transfer residual toner collection operation of the image forming apparatus 100 of this embodiment, a threshold value is set for the white background toner amount, and in the image forming unit Pa to Pd having the white background toner amount less than the threshold value, when the transfer residual toner is temporarily collected by the collecting roller 31, the collecting roller 31 is applied with the voltage having the opposite polarity (negative polarity) to the toner charge polarity, and when the transfer residual toner is moved to the photosensitive drum 1*a* to 1*d* again, the collecting roller 31 is applied with the voltage having the same polarity (positive polarity) as the toner charge polarity.

On the other hand, in the image forming unit Pa to Pd having the white background toner amount that is the threshold value or more, when the transfer residual toner is temporarily collected by the collecting roller 31, the collecting roller 31 is applied with the voltage having the same polarity (positive polarity) as the toner charge polarity, and when the transfer residual toner is moved to the photosensitive drum 1*a* to 1*d* again, the collecting roller 31 is applied with the voltage having the opposite polarity (negative polarity) to the toner charge polarity.

The threshold value of the white background toner amount may be one value, or two or more threshold values may be set. If two or more threshold values are set, the voltage that is applied to the collecting roller 31 is changed in accordance with the threshold value. In this way, the voltage corresponding to the toner charge amount can be applied to the collecting roller 31, and it is possible to efficiently perform adhesion of the transfer residual toner to the collecting roller 31 and movement of the transfer residual toner from the collecting roller 31 to the photosensitive drum 1*a* to 1*d*.

Figure 4:
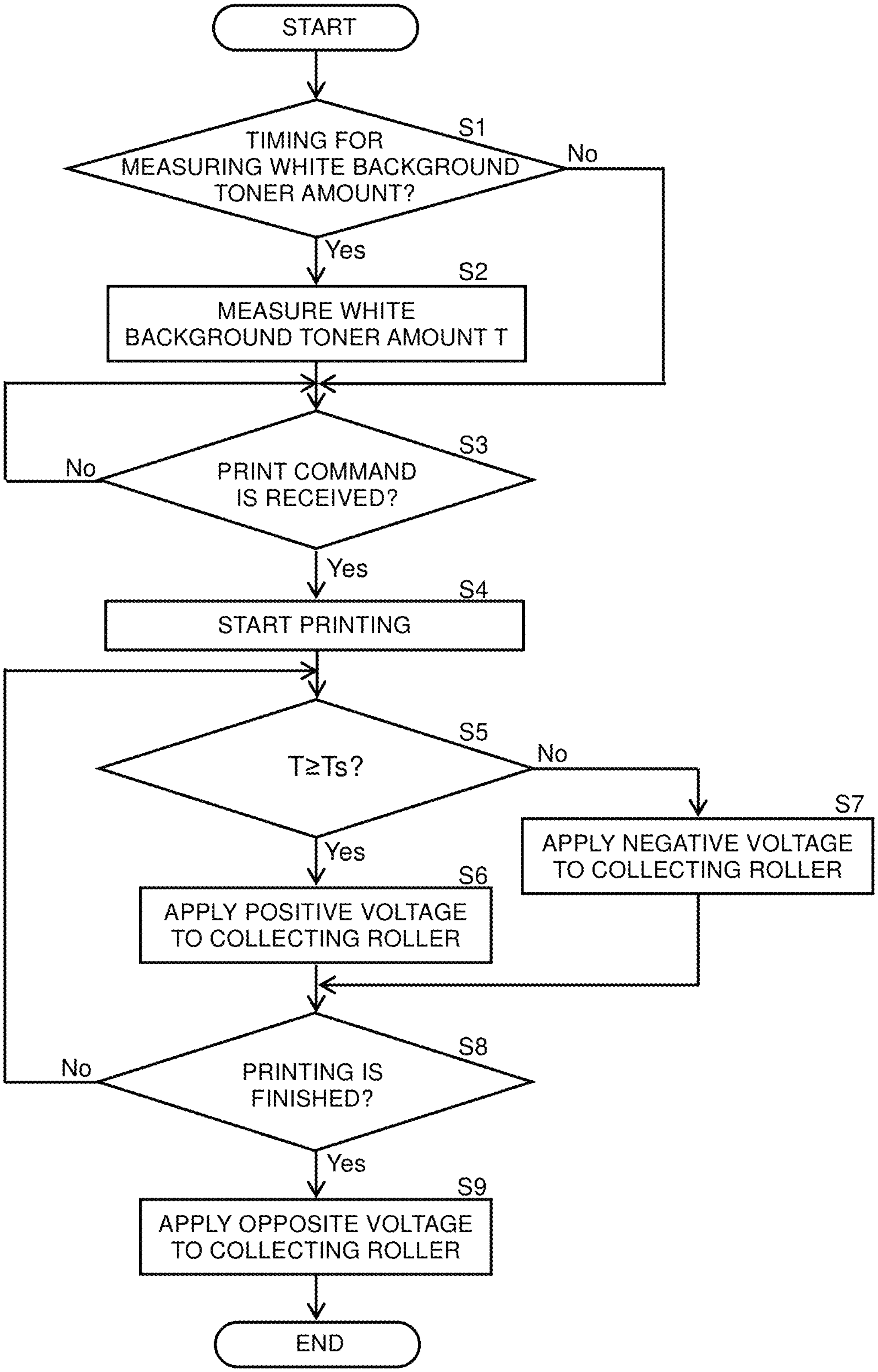
FIG. 4 is a flowchart illustrating a control example of a transfer residual toner collection mode in the image forming apparatus of the present disclosure.

FIG. 4 is a flowchart illustrating a control example of the transfer residual toner collection operation in the image forming apparatus 100 of the present disclosure. With reference to FIGS. 1 to 3 as necessary, the execution procedure of the transfer residual toner collection operation is described with reference to the steps in FIG. 4.

First, the main control unit 80 determines whether or not it is timing for measuring the white background toner amount (Step S1). If it is the timing for measuring the white background toner amount such as when the image forming apparatus 100 is powered on or when returning from the sleep mode (Yes in Step S1), the reference image (patch image) is formed on the intermediate transfer belt 8, and the white background toner amount T is detected (Step S2). The detected white background toner amount T is stored in the storage unit 70. If it is not the timing for measuring the white background toner amount (No in Step S1), the white background toner amount T that was detected at the just previous timing for measuring the white background toner amount and was stored in the storage unit 70 is used to perform the following steps.

Next, the main control unit 80 determines whether or not the print command is received (Step S3). If the print command is not received (No in Step S3), a print standby state is continued. If the print command is received (Yes in Step S3), printing is started (Step S4).

Next, the main control unit 80 determines whether or not the white background toner amount on the intermediate transfer belt 8 T detected by the image density sensor 25 is a predetermined threshold value Ts or more (Step S5). If $T \geq Ts$ holds (Yes in Step S5), it is estimated that the toner charge amount is decreased, and hence the positive voltage having the same polarity as the toner charge polarity is applied to the collecting roller 31 during printing (Step S6). If $T < Ts$ holds (No in Step S5), it is estimated that the toner charge amount is not decreased, and hence the negative voltage having the opposite polarity to the toner charge polarity is applied to the collecting roller 31 during printing (Step S7).

After that, the main control unit 80 determines whether or not the printing is finished (Step S8). If the printing is continued (No in Step S8), the process returns to Step S5, and the application of the voltage to the collecting roller 31

(the toner adhesion step) is continued while the printing operation is continued (Steps S5 to S7).

On the other hand, if the printing is finished (Yes in Step S8), a voltage opposite to the voltage applied in Step S6 or S7 is applied to the collecting roller 31 in a state where the developing roller 30 is separated from the photosensitive drum 1*a* to 1*d*, so that the toner adhered to the collecting roller 31 is moved to the photosensitive drum 1*a* to 1*d* (Step S9, the toner moving step). After that, the toner is moved from the photosensitive drum 1*a* to 1*d* to the intermediate transfer belt 8, and is collected by the belt cleaner 19 (the toner collecting step), so as to finish the transfer residual toner collection operation.

According to the control example illustrated in FIG. 4, even if the toner charge amount changes due to a change in the absolute humidity or the like, the transfer residual toner can appropriately adhere to the collecting roller 31, and after moving the transfer residual toner adhered on the collecting roller 31 to the intermediate transfer belt 8 via the photosensitive drum 1*a* to 1*d*, the transfer residual toner can be appropriately removed using the belt cleaner 19. Therefore, it is possible to effectively suppress background fogging or mixture of colors in the image forming unit on the downstream side in the moving direction of the intermediate transfer belt 8, which is caused by the transfer residual toner in the image forming unit on the upstream side.

(Other Preferred Structure)

If the white background toner amount is the threshold value or more (if the toner charge amount is decreased), it is preferred, before first printing operation after the transfer residual toner collection operation is performed, in a state where the photosensitive drum 1*a* to 1*d* and the developing roller 30 are separated from each other, to apply the collecting roller 31 with the voltage having the same polarity as the toner charge polarity that was applied when the transfer residual toner was moved again to the photosensitive drum 1*a* to 1*d* in the just previous transfer residual toner collection operation.

In this way, the transfer residual toner held on the collecting roller 31 can be completely removed (reset), and there is no possibility that the transfer residual toner remaining on the collecting roller 31 would move to the photosensitive drum 1*a* to 1*d*, when a printing operation is started and polarity of the voltage applied to the collecting roller 31 is switched. In addition, it may be possible to alternately apply a positive polarity voltage and a negative polarity voltage to the collecting roller 31. In this way, both positively charged toner and reversely charged toner remaining on the collecting roller 31 can be removed.

Note that if the white background toner amount is less than the threshold value (if the toner charge amount is not decreased), sufficient toner is discharged from the collecting roller 31 to the photosensitive drum 1*a* to 1*d* in the toner moving step after printing is finished. Therefore, it is not necessary to perform the reset operation described above before the first printing operation.

In addition, if the white background toner amount is the threshold value or more, it is preferred to increase operating time of the collecting roller 31 and the photosensitive drum 1*a* to 1*d* (execution time of the toner moving step), when the toner that is temporarily collected from the photosensitive drum 1*a* to 1*d* to the collecting roller 31 is moved to the photosensitive drum 1*a* to 1*d* again, to be longer than that when the developing current is the threshold value or more. In addition, if the white background toner amount is the threshold value or more, it is preferred to decrease rotation speed of the photosensitive drum 1*a* to 1*d*, when the transfer residual toner that is temporarily adhered to the collecting roller 31 is moved to the photosensitive drum 1*a* to 1*d* again, to be slower than that when the developing current is the threshold value or more.

In this way, the toner with decreased charge amount, which is hardly moved by an electric field, can be effectively and securely moved again from the collecting roller 31 to the photosensitive drum 1*a* to 1*d*.

Further, if the white background toner amount is the threshold value or more, it is preferred to increase the charging voltage that is applied to the charging roller 34 during movement of the transfer residual toner from the collecting roller 31 to the photosensitive drum 1*a* to 1*d*, to be higher than that when the developing current is the threshold value or more.

In this way, the electric field between the collecting roller 31 and the photosensitive drum 1*a* to 1*d* during the toner moving step is increased, and hence the toner with decreased charge amount, which is hardly moved by an electric field, can be effectively and securely moved again from the collecting roller 31 to the photosensitive drum 1*a* to 1*d*.

In addition, if there is the image forming unit Pa to Pd having the white background toner amount that is the threshold value or more, the collecting roller 31 is applied with the voltage having the same polarity as the toner charge polarity in the toner adhesion step, and in the toner moving step, the voltage having the opposite polarity to the toner charge polarity is applied to at least one of the collecting roller 31 of the image forming unit having the white background toner amount that is the threshold value or more (e.g., the image forming unit Pa), and the collecting roller 31 of the image forming unit disposed next to the above image forming unit on the downstream side in the conveying direction of the intermediate transfer belt 8 (the image forming unit Pb).

In this way, in both the image forming unit having a low toner charge amount and the image forming unit next thereto on the downstream side, background fogging or mixture of colors can be effectively suppressed.

Other than that, the present disclosure is not limited to the embodiment described above, but can be variously modified within the scope of the present disclosure without deviating from the spirit thereof. For instance, the present disclosure is not limited to the developing device equipped with the developing roller 30 illustrated in FIG. 2, but can be applied to any image forming apparatus 100 equipped with various types of the developing device using two-component developer containing toner and carrier. For instance, the present disclosure can also be applied in exactly the same manner to a developing method, in which the developing device 3*a* to 3*d* includes a magnetic roller (toner supply roller) that carries developer on its outer circumference surface, and only toner in the developer carried on the magnetic roller is supplied to the developing roller 30, so that a toner layer is formed on an outer circumference surface of the developing roller 30, and that an electrostatic latent image on the photosensitive drum 1*a* to 1*d* is developed. In addition, it can also be applied to a magnetic one-component developing type image forming apparatus 100 that uses magnetic one-component developer containing only magnetic toner.

In addition, in the embodiment described above, the color printer illustrated in FIG. 1 is exemplified as the image forming apparatus 100, but without limiting to the color printer, it may be other intermediate transfer type image forming apparatus such as a color copier, a digital multifunction peripheral, or a facsimile machine.

The present disclosure can be applied to an intermediate transfer type image forming apparatus, in which individual color toner images formed on image carriers are primarily transferred onto an intermediate transfer body, and then are secondarily transferred onto a recording medium. Using the present disclosure, it is possible to provide an image forming apparatus that can appropriately collect transfer residual toner by a collecting roller, even if it has low charge amount or opposite polarity.

What is claimed is:

1. An image forming apparatus comprising:

a plurality of image forming units each including an image carrier having a photosensitive layer on a surface thereof, a charging device that charges the image carrier, an exposing device that exposes the image carrier charged by the charging device so as to form an electrostatic latent image, and a developing device having a developer carrier that carries developer containing toner, the developing device allowing the toner to adhere to the electrostatic latent image formed on the image carrier, so as to form a toner image;

an intermediate transfer body that is capable of moving along the plurality of image forming units, so that the toner image formed by the image forming unit is primarily transferred onto the intermediate transfer body;

a primary transfer member that primarily transfers the toner image formed on the image carrier onto the intermediate transfer body;

a secondary transfer member that secondarily transfers onto a recording medium the toner image transferred onto the intermediate transfer body;

a cleaning mechanism that removes the toner adhered to the intermediate transfer body;

a developing voltage power supply that applies a developing voltage to the developer carrier;

a charging voltage power supply that applies a charging voltage to the charging device;

a transfer voltage power supply that applies transfer voltages to the primary transfer member and the secondary transfer member;

a collecting roller disposed in each of the plurality of image forming units, so as to collect transfer residual toner remaining on the image carrier after the primary transfer;

a cleaning voltage power supply that applies a voltage to the collecting roller; and a control unit that controls the image forming unit, the developing voltage power supply, the transfer voltage power supply, the charging voltage power supply, and the cleaning voltage power supply, wherein the image forming apparatus performs a transfer residual toner collection operation including a toner adhesion step of applying the collecting roller with a voltage having opposite polarity to charge polarity of the toner during execution of an image forming operation, so as to allow the transfer residual toner to temporarily adhere to the collecting roller, a toner moving step of separating the developer carrier and the image carrier from each other after finishing the image forming operation, and then applying the collecting roller with a voltage having the same polarity as the charge polarity of the toner, so as to move the transfer residual toner adhered on the collecting roller to the image carrier, and a toner collecting step of moving the transfer residual toner from the image carrier to the intermediate transfer body, so that the cleaning mechanism collects the transfer residual toner, the image forming apparatus further comprises a toner amount detection unit that detects white background toner amount on the intermediate transfer body, and the control unit controls the image forming unit having the white background toner amount that is a threshold value or more, to apply the collecting roller with the voltage having the same polarity as the charge polarity of the toner in the toner adhesion step, and to apply the collecting roller with the voltage having opposite polarity to the charge polarity of the toner in the toner moving step, so as to perform the transfer residual toner collection operation.

2. The image forming apparatus according to claim 1, wherein the control unit controls the image forming unit having the white background toner amount that is the threshold value or more, to apply the collecting roller with the voltage having the same polarity as the charge polarity of the toner, in the state where the developer carrier and the image carrier are separated from each other, before first image forming operation after the transfer residual toner collection operation is performed.

3. The image forming apparatus according to claim 1, wherein the control unit controls the image forming unit having the white background toner amount that is the threshold value or more, to apply the collecting roller alternately with the voltage having the same polarity as the charge polarity of the toner and the voltage having the opposite polarity to the same, in the state where the developer carrier and the image carrier are separated from each other, before first image forming operation after the transfer residual toner collection operation is performed.

4. The image forming apparatus according to claim 1, wherein the control unit increases execution time of the toner moving step, in the image forming unit having the white background toner amount that is the threshold value or more, to be longer than that in the image forming unit having the toner amount less than the threshold value.

5. The image forming apparatus according to claim 1, wherein the control unit decreases rotation speed of the image carrier that is executing the toner moving step, in the image forming unit having the white background toner amount that is the threshold value or more, to be slower than that in the image forming unit having the toner amount less than the threshold value.

6. The image forming apparatus according to claim 1, wherein the control unit applies the charging device with the charging voltage during execution of the toner moving step, in the image forming unit having the white background toner amount that is the threshold value or more.

7. The image forming apparatus according to claim 1, wherein the plurality of image forming units are arranged in parallel along a moving direction of the intermediate transfer body, and if there is an image forming unit having the white background toner amount that is the threshold value or more, the control unit controls not only the image forming unit but also an image forming unit next to the said image forming unit on the downstream side in the moving direction, to apply the collecting roller with the voltage having the same polarity as the charge polarity of the toner when the toner collecting step is executed, and to apply the collecting roller with the voltage having opposite polarity to the charge polarity of the toner when the toner moving step is executed.

* * * * *